(12) United States Patent
Bittner

(10) Patent No.: US 7,411,320 B2
(45) Date of Patent: Aug. 12, 2008

(54) RADIALLY-ACTIVATED ENGINE

(76) Inventor: George E. Bittner, 7794 Hallenbeck Rd., Cleveland, NY (US) 13042

( * ) Notice: Subject to any disclaimer, the term of this patent is extended or adjusted under 35 U.S.C. 154(b) by 196 days.

(21) Appl. No.: 11/257,975

(22) Filed: Oct. 25, 2005

(65) Prior Publication Data

US 2007/0090697 A1 Apr. 26, 2007

(51) Int. Cl.
*H02K 33/00* (2006.01)
(52) U.S. Cl. ............... 310/20; 310/80; 91/491; 74/89
(58) Field of Classification Search ......... 310/20, 310/22–24, 28, 30, 80; 74/89; 91/36, 40, 91/491, 72
See application file for complete search history.

(56) References Cited

U.S. PATENT DOCUMENTS

| | | | | |
|---|---|---|---|---|
| 3,961,558 A * | 6/1976 | Dokukin et al. | ............... | 91/35 |
| 3,992,132 A * | 11/1976 | Putt | ........................... | 417/271 |
| 4,503,751 A * | 3/1985 | Pinson | ........................... | 91/36 |
| 5,101,925 A * | 4/1992 | Walker | ........................ | 180/243 |
| 5,224,411 A * | 7/1993 | Fillion | ........................... | 91/525 |
| 5,263,401 A * | 11/1993 | Walker | ........................ | 91/491 |
| 5,657,681 A * | 8/1997 | Henricson | ..................... | 91/472 |
| 5,729,067 A * | 3/1998 | Janutka | ........................... | 310/135 |
| 5,777,404 A * | 7/1998 | Has | .............................. | 310/12 |
| 6,575,078 B1 * | 6/2003 | Wright et al. | ................. | 91/491 |
| 6,809,426 B2 * | 10/2004 | Naar et al. | ................... | 290/1 R |
| 6,837,141 B1 * | 1/2005 | Edelson | ........................ | 91/491 |
| 2004/0172941 A1 * | 9/2004 | Bittner | ........................ | 60/514 |
| 2005/0212386 A1 * | 9/2005 | Miyazawa | ................... | 310/328 |

* cited by examiner

*Primary Examiner*—Dang D Le
(74) *Attorney, Agent, or Firm*—George R. McGuire; Bond Schoeneck & King, PLLC

(57) ABSTRACT

A motor includes a plurality of linearly activated pistons, positioned radially around an axis, which are selectively and sequentially biased against on offset element to produce rotation of a rotatable element about the axis. The motor further includes an power source, which may be electrical, pneumatic or hydraulic and a structure for supporting the pistons, the offset element and the rotational element, and providing direction of a desired motion.

10 Claims, 5 Drawing Sheets

RADIALLY-ACTIVATED ENGINE

BACKGROUND OF THE INVENTION

1. Field of the Invention

The present invention relates to a radially-activated engine, and more particularly to an engine that moves actuators in a linear direction, to produce rotational motion without the use of wrist pins or crankshafts.

2. Description of Prior Art

There are various engines or motors for transforming electrical energy into mechanical energy. Generally, such engines rely on the attraction and repulsion of two magnets, one of which is fixed and the other of which is rotatable. As the rotatable magnet (typically an electromagnet) turns, a commutator mechanism causes the magnet's polarity to alternate so that there is a continuing attraction between the two magnets that produces rotation. In such devices, the power generated by the engine depends on the strength of the magnets, which generally depends on their size. Higher power requires larger magnets, which makes it difficult to produce an electric motor with a shallow depth. Typical electric motors have a depth that is approximately equal to their diameter, which is disadvantageous in many applications. While it is known to make motors using radially-oriented linear actuators, such motors use a linkage between the actuators and the motor's rotating element, such as wrist pins, connecting rods and crankshafts. These elements complicate the operation and maintenance of the typical motor. In addition, such electric motors do not permit simple adjustment of the torque produced by the motor. Altering a conventional electric motor's torque requires redesigning the motor or adding a transmission.

Similarly, there are various engines or motors for transforming pneumatic or hydraulic pressure into mechanically useful forms of motion. Such engines, however, tend to produce only linear motion, or have a depth that is substantially similar to their diameter.

What is needed is a motor for converting linear motion into rotational motion, which has a depth substantially smaller than its diameter. What is also needed is a motor that is capable of simple torque adjustment.

Objects and Advantages

It is an aspect of the claimed invention to provide a motor that has radially oriented pistons that act against an offset element to produce rotation, resulting in a motor that is substantially thinner than its diameter.

It is yet another aspect of the claimed invention to provide a motor that is easily adjustable to produce varying amounts of speed, power and torque, depending on the current or pressure provided and the angle at which the linear actuators act on the offset element.

SUMMARY OF THE INVENTION

A motor includes a plurality of pistons positioned radially about an axis, for acting against on offset element to produce rotation of an apparatus about the axis. This is accomplished by selectively and sequentially activating the pistons to exert force against the offset element. The pistons can be actuated electromagnetically, electrostatically or by application of a working fluid such as hydraulic fluid or pressurized gas. Because of the offset element's off-center nature, biasing a piston against it causes relative rotation between the piston and the offset element. In one embodiment, the offset element is located within a rotating member that contains the pistons and is fixed to a frame in a position that is offset from the axis of rotation of the motor's rotating member. In an alternate embodiment, the offset element is externally positioned, for example an external housing in which the distance between the housing and the motor's axis of rotation varies. In this embodiment the pistons are connected and rotate with the motor's rotational element and are selectively biased against the external offset member. The motor further includes an electrical power source and a structure for supporting the pistons, the offset element and the rotational element.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
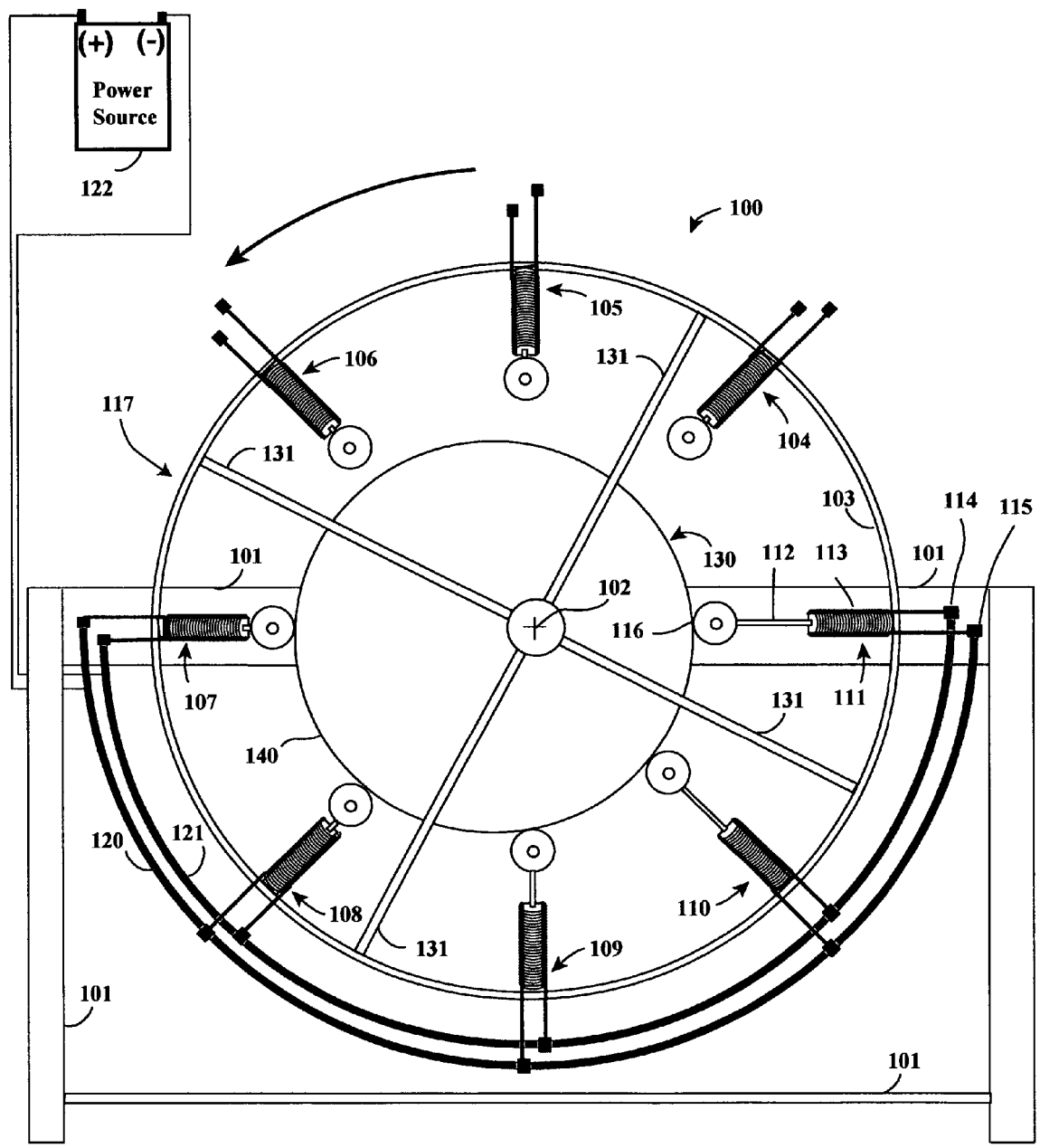
FIG. 1 shows a cross-section of an electric motor having an offset hub according to a preferred embodiment of the invention.

Referring to FIG. 1, there is an electric motor 100, comprising a frame 101 and a rotatable assembly 117 with an axle 102, a rim 103 and a plurality of support arms 131 for connecting the axle 102 to the rim 103. The axle 102 is rotatably connected to the frame 101. A plurality of actuators 104-111 are positioned approximately radially around the rotatable assembly 117. The actuators 104-111 are positioned such that they are approximately equidistant from each other.

Each actuator 104-111 includes an actuator shaft 112, an electromagnet 113 and two leads 114, 115 for providing electrical power to the electromagnet 113. In lieu of an electromagnet 113, actuator 104-111 can include an electrostatic force generator (not shown). Preferably, each actuator 104-111 also includes a roller 116 or another friction reducing element, such as a bearing or low friction pad at its inner end. Preferably, each actuator 104-111 includes a spring or other biasing element that maintains the actuator shaft 112 in a retracted position unless the electromagnet 113 is activated.

The leads 114, 115 may be positioned anywhere that they can contact a power supply rails 120, 121. Power supply rails 120, 121 are positioned to provide electrical power from power source 122 to actuators 104 throughout approximately half of the rotational cycle of the electric motor 100. Power source 122 preferably is a battery or other direct current power source. Power source 122 may also be an alternating current source, depending on the actuating current required by actuators 104-111. Instead of power supply rails 120, 121, engine 100 can use sensor and controller means as described more fully below (see FIG. 5).

Frame 101 also includes a circular element 130 that is positioned such that it is not centered on the axle 102 of the rotatable assembly 117. Circular element 130 is fixed in position relative to frame 101 and does not rotate.

In operation of electric motor 100, leads 114, 115 of an actuator one of actuators 104-111 contact power supply rails 120, 121 and activate electromagnet 113, causing it to extend out of said one of actuators 104-111. As it extends out of actuator 104 the end of actuator shaft 112 or a roller 116 at the end of actuator shaft 112 contacts the perimeter of circular element 130. As actuator shaft 112 exerts force on the perimeter of circular element 130, it causes rotatable assembly 117 to rotate in a direction that increases the distance between rim 103 and the perimeter of circular element 130. As rotatable assembly 117 rotates, actuators 104-111 receive current from power supply rails 120, 121 and continue to exert force against circular element 130, throughout approximately half of the rotational cycle of rotatable assembly 117.

Figure 2:
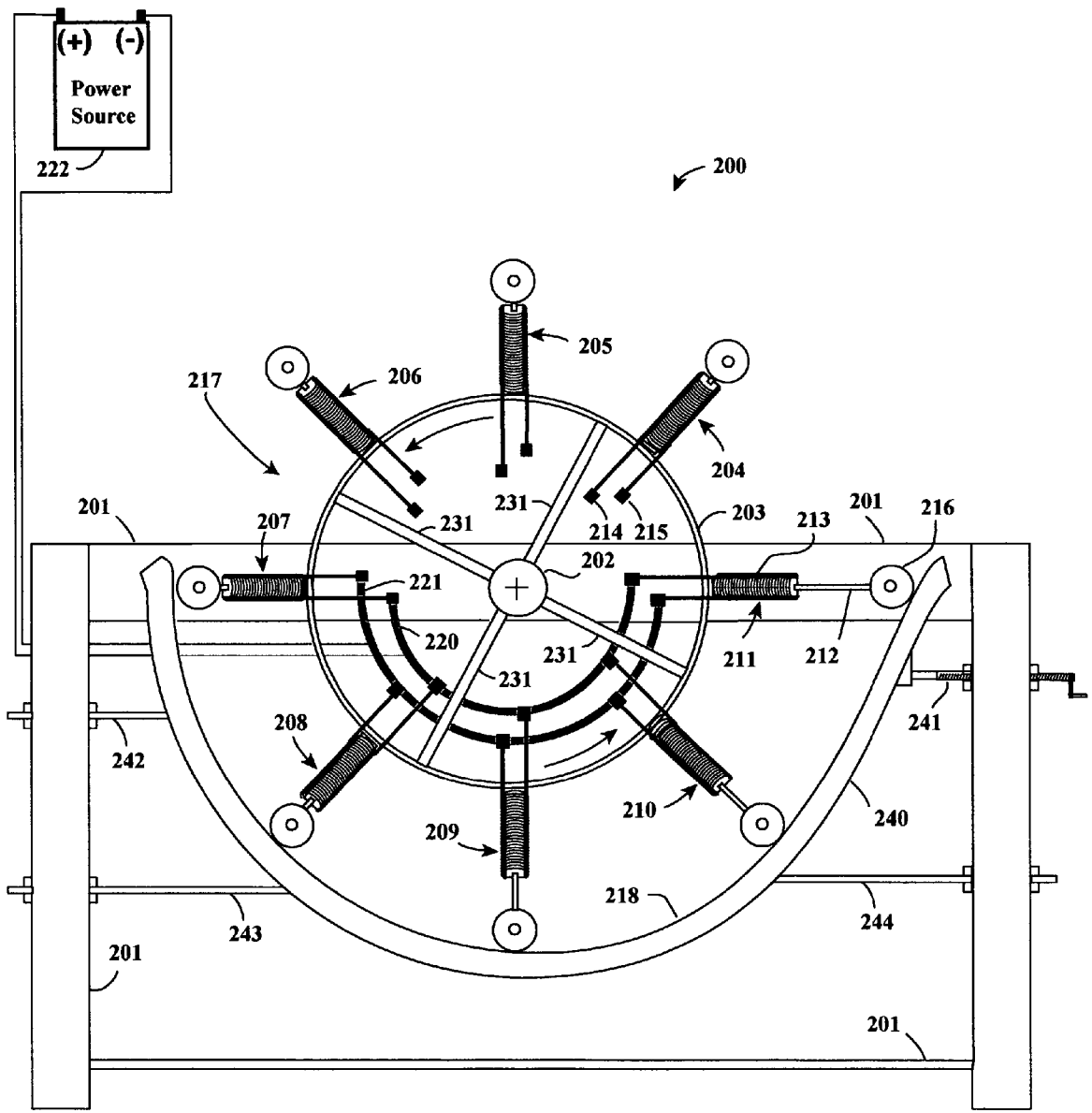
FIG. 2 shows a cross-section of an electric motor having an external offset element that is adjustable according to another embodiment of the invention.

Referring now to FIG. 2, there is an electric motor 200 according to another embodiment of the invention, comprising a frame 201, a rotatable assembly 217 with an axle 202, a rim 203 and a plurality of supports 231 for connecting the rim 203 to the axle 202. The axle 202 is rotatably connected to the frame 201. A plurality of actuators 204-211 is attached approximately radially to the rotatable assembly 217. The actuators 204-211 are positioned approximately an equal distance from each other around the perimeter of rotatable assembly 217.

Each actuator 204-211 includes an actuator shaft 212, an electromagnet 213 and two leads 214, 215 for providing electrical power to the electromagnet 213. In lieu of an electromagnet 213, actuator 204-211 can include an electrostatic force generator (not shown). Preferably, actuators 204-211 also include rollers 216 or another friction reducing element, such as a bearing or low friction pad at their outer ends. Preferably, actuators 204-211 include a spring or other biasing element that maintains the actuator shaft 212 in a retracted position unless the electromagnet 213 is activated. The leads 214, 215 may be positioned anywhere that they can contact power supply rails 220, 221. Power supply rails 220, 221 are positioned to provide electrical power from power source 222 to actuators 204-211 throughout approximately half of the rotational cycle of the electric motor 200. Power source 222 preferably is a battery or other direct current power source. Power source 222 may also be an alternating current source, depending on the actuating current required by actuators 204-211.

Frame 201 also includes a force-directing structure 240 having an inner surface 218. Force-directing structure 240 is positioned such that the distance between inner surface 218 and axle 202 increases from a first end of force-directing structure 240 to its second end. Preferably, the ends of force-directing structure 240 flare slightly away from axle 202, as shown in FIG. 2.

In operation of electric motor 200, leads 214, 215 of one of actuators 204-211 contact power supply rails 220, 221 and activate electromagnet 213, causing it to extend out of actuator 204-211. As it extends out of actuator 204-211 the end of actuator shaft 212 or a roller 216 at the end of actuator shaft 212 contacts the inner surface 218 of force-directing structure 240. As actuator shaft 212 exerts force against the inner surface 218 of force-directing structure 240, it causes rotatable assembly 217 to rotate in a direction that increases the distance between rim 203 and the inner surface 218 of force-directing structure 240. As rotatable assembly 217 rotates, said one of actuators 204-211 continues to receive current from power supply rails 220, 221 and continues to exert force against inner surface 218 of force-directing structure 240, until said one of actuators 204-211 has rotated approximately 180 degrees around axle 202, at which point the power supply rails 220, 221 end and said one of actuators 204-211 no longer receives current and no longer exerts force against inner surface 218 of force-directing structure 240. Preferably, actuators 204-211 include a spring or other biasing element that maintains the actuator shaft 112 in a retracted position unless the electromagnet 113 is activated.

According to one embodiment, frame 201 includes an adjusting screw 241 and slides 242-244, or other means for modifying the position of force-directing structure 240 relative to rotatable assembly 217. According to this embodiment, adjusting screw 241 can be adjusted to move the force-directing structure 240 relative to axle 202. By moving the force-directing structure 240 relative to the axle 202, it is possible to increase or reduce the range of extension that is possible for actuators 204-211 and concurrently modify the angle of incidence between each actuator shaft 212 and the inner surface 218 of force-directing structure 240. For example, force-directing structure 240 can be moved laterally relative to axle 202 by use of slides 242, 243 and 244. Alternately, a portion of force-directing structure 240 can be hingedly fixed in position and the force-directing structure 240 can be rotated to modify the distance between force-directing structure 240 and axle 202. Modifying the position of force-directing structure 240 provides a unique solution for adjusting the torque and speed output of electric motor 200. This adjustment can be made during operation of the motor 200. This makes it possible to adjust motor loads without the need for an additional transmission or torque converter assembly.

Figure 3:
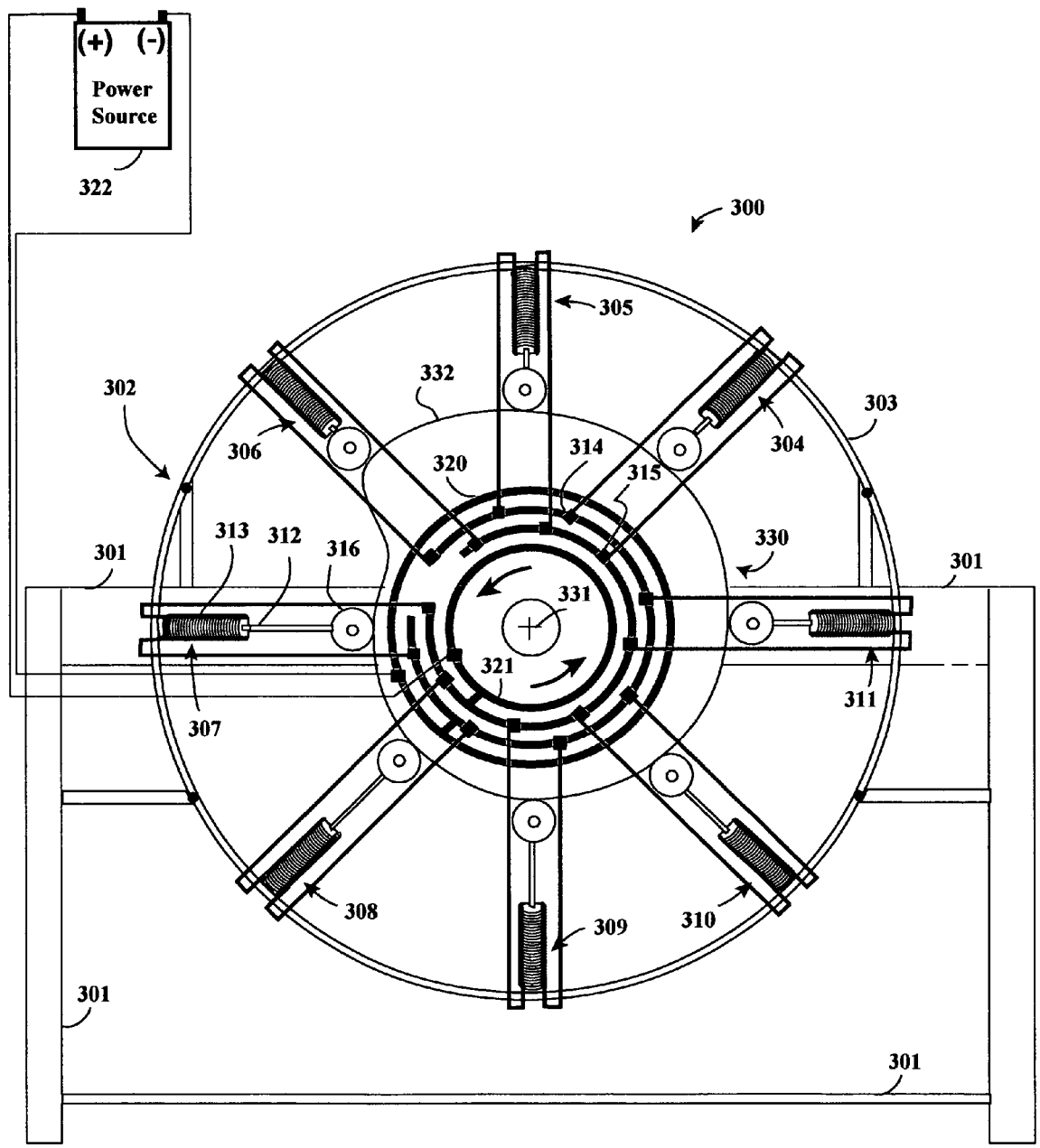
FIG. 3 shows a cross-section of an electric motor having a rotatable assembly that is spiral in shape according to another embodiment of the invention.

Referring now to FIG. 3, there is shown an electrical motor 300 according to another embodiment of the invention, comprising a frame 301, which includes an actuator assembly 302 having a rim 303. Actuator assembly 302 is preferably circular and includes a plurality of actuators 304-311 approximately radially positioned relative to the actuator assembly 302. Electric motor 300 also includes a rotatable assembly 330. Rotatable assembly 330 rotates about axle 331, which is rotatably connected to frame 301. Rotatable assembly 330 preferably has a spirally-shaped rim 332.

Each actuator 304-311 includes an actuator shaft 312, an electromagnet 313 and two leads 314, 315 for providing electrical power to the electromagnet 313. In lieu of an electromagnet 313, actuator 304-311 can include an electrostatic force generator (not shown). Preferably, actuator 304-311 also includes a roller 316 or another friction reducing element, such as a bearing or low friction pad at its inner end. Preferably, actuators 304-311 include a spring or other biasing element that maintains the actuator shaft 312 in a retracted position unless the electromagnet 313 is activated. Actuators 304-311 may be adjustably attached to actuator assembly 302 so that the angle of incidence between each of said actuators 304-311 and said rotatable assembly 330 can be adjusted to control the torque and speed output of motor 300.

The leads 314, 315 may be positioned anywhere that they can contact power supply rails 320, 321. Power supply rails 320, 321 are positioned to provide electrical power from power source 322 to actuators 304-311 throughout a portion of the rotational cycle of the electric motor 300. The length of power supply rails 320, 321 determines the portion of the rotational cycle during which electrical power is provided to actuators 304-311. The portion of the rotational cycle during which electrical power is provided to any one of actuators 304-311 can be selected according to the desired speed of motor 300, provided that power must be applied to any one actuator 304-311 for less than the entire rotational cycle, to allow time for the actuator 304-311 to retract. Power source 322 preferably is a battery or other direct current power source. Power source 322 may also be an alternating current source, depending on the actuating current required by actuators 304-311.

In operation of electric motor 300, when leads 314, 315 of one of actuators 304-311 contact power supply rails 320, 321 they provide current that activates electromagnet 313, causing it to extend out of said one of actuators 304-311. As it extends out of actuator 304-311 the end of actuator shaft 312 or a roller 316 at the end of actuator shaft 312 contacts the rim 332 of rotatable assembly 330. As actuator shaft 312 exerts force on the rim 332 of rotatable assembly 330, it causes rotatable assembly 330 to rotate in a direction that increases the distance between actuator assembly rim 303 and the rim 332 of rotatable assembly 330. As rotatable assembly 330 rotates and while leads 314, 315 of said one of actuators 304-311 continues to receive current from power supply rails 320, 321, said one of actuators 304-311 continues to exert force against rim 332 of rotatable assembly 330, until said one of actuators 304-311 has rotated a portion of the distance around axle 331, at which point leads 314, 315 no longer contact the power supply rails 320, 321 and said one of actuators 304-311 no longer receives current and no longer exerts force against rim 332 of rotatable assembly 330.

According to this embodiment, it is possible to vary the shape of the rotatable assembly 330 to match the force output of actuators 304-311, to provide an even application of torque or speed to a particular motor load. Specifically, the angle or degree of spiral of rim 332 can be modified to produce more or less torque.

Figure 4:
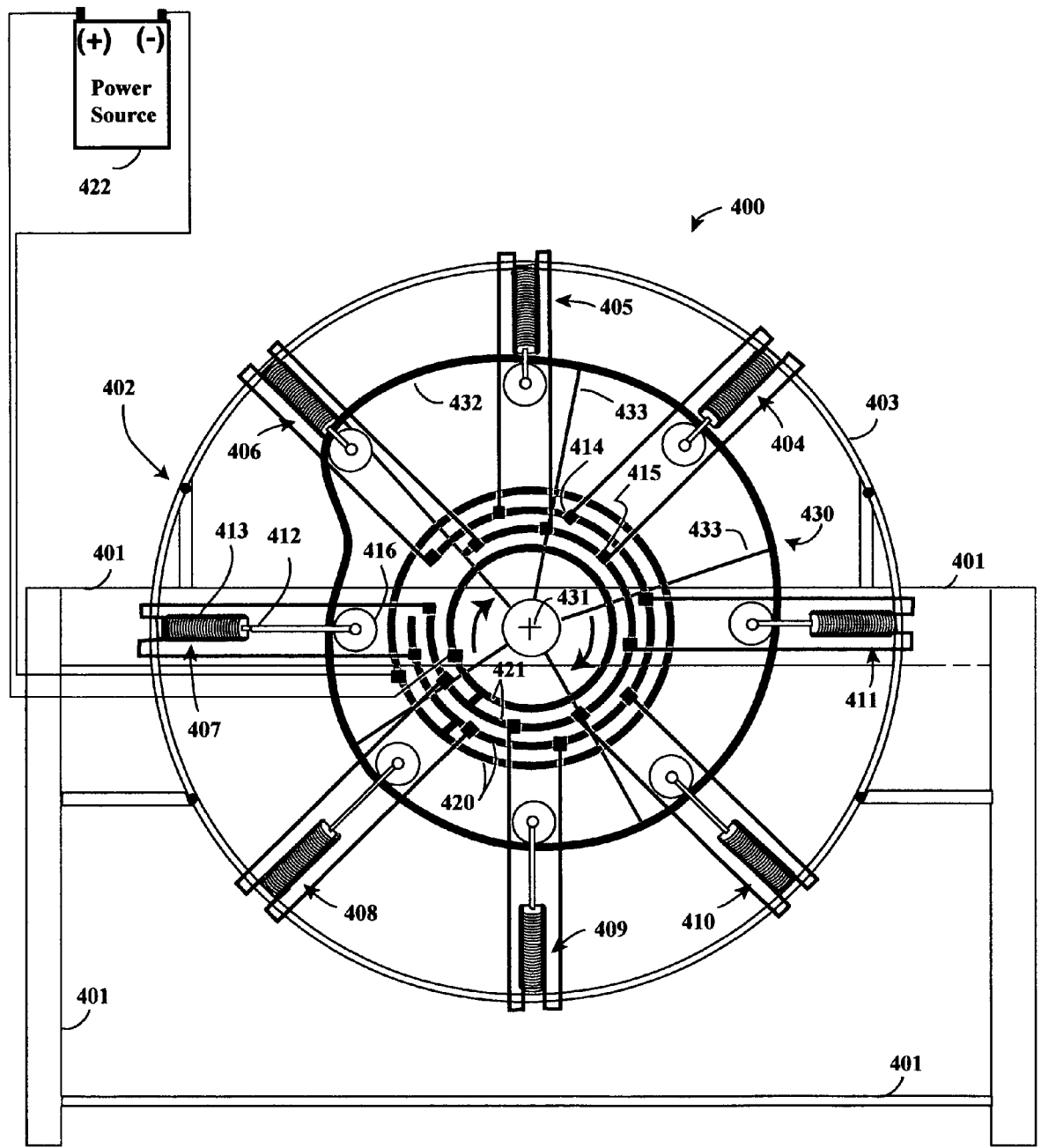
FIG. 4 shows a cross-section of an electric motor having a rotatable assembly that is spiral in shape and uses retractable pistons according to another embodiment of the invention.

Referring now to FIG. 4, there is shown an electrical motor 400 according to another embodiment of the invention, comprising a frame 401, which includes an actuator assembly 402 having a rim 403. Actuator assembly 402 is preferably circular and includes a plurality of actuators 404-411 positioned approximately radially relative to the actuator assembly 402. The actuators 404-211 are positioned approximately an equal distance from each other around the perimeter of actuator assembly 402. Electric motor 400 also includes a rotatable assembly 430. Rotatable assembly 430 rotates about axle 431, which is rotatably connected to frame 401. Rotatable assembly 430 preferably has a spirally-shaped rim 432 about its perimeter and includes a plurality of spokes 433 to support rim 432.

Each actuator 404-411 includes an actuator shaft 412, an electromagnet 413 and two leads 414, 415 for providing electrical power to the electromagnet 413. In lieu of an electromagnet 413, actuator 404-411 can include an electrostatic force generator (not shown). Preferably, actuator 404-411 also includes a roller 416 or another friction reducing element, such as a bearing or low friction pad at its inner end. Preferably, actuators 404-411 include a spring or other biasing element that maintains the actuator shaft 412 in an extended position unless the electromagnet 413 is activated. Actuators 404-411 may be adjustably attached to actuator assembly 402 so that the angle of incidence between each of said actuators 404-411 and said rotatable assembly 430 can be adjusted to control the torque and speed output of motor 400.

The leads 414, 415 may be positioned anywhere that they can contact power supply rails 420, 421. Power supply rails 420, 421 are positioned to provide electrical power from power source 422 to actuators 404-411 throughout a portion of the rotational cycle of the electric motor 400. The length of power supply rails 420, 421 determines the portion of the rotational cycle during which electrical power is provided to actuators 404-411. The portion of the rotational cycle during which electrical power is provided to any one of actuators 404-411 can be selected according to the desired speed of motor 400, provided that power must be applied to any one actuator 404-411 for less than the entire rotational cycle, to allow time for the actuator 404-411 to return to an extended position. Power source 422 preferably is a battery or other direct current power source. Power source 422 may also be an alternating current source, depending on the actuating current required by actuators 404-411.

In operation of electric motor 400, when leads 414, 415 of one of actuators 404-411 contact power supply rails 420, 421 they provide current that activates electromagnet 413, causing it to retract into said one of actuators 404-411. As it retracts into said one of actuators 404-411 a roller 416 at the end of actuator shaft 412 contacts the inner portion of rim 432 of rotatable assembly 430. As actuator shaft roller 416 exerts force on the rim 432 of rotatable assembly 430, it causes rotatable assembly 430 to rotate in a direction that decreases the distance between actuator assembly rim 403 and the rim 432 of rotatable assembly 430. As rotatable assembly 430 rotates and while leads 414, 415 of said one of actuators 404-411 continue to receive current from power supply rails 420, 421, actuator shaft roller 416 continues to exert force against the inside of rim 432 of rotatable assembly 430, until said one of actuators 404-411 has rotated a portion of the distance around axle 431, at which point leads 414, 415 no longer contact the power supply rails 420, 421 and actuator 404-411 no longer receives current and no longer exerts force against rim 432 of rotatable assembly 430. When said one of actuators 404-411 no longer receives current from power supply 422, actuator shaft 416 is free to move relative to said one of actuators 404-411 or, preferably, is biased to an extended position as described above.

According to this embodiment, it is possible to vary the shape of the rotatable assembly 430 to match the force output of actuators 404-411, to provide an even application of torque or speed to a particular motor load. Specifically, the angle or degree of spiral of rim 432 can be modified to provide a motor 400 that produces more or less torque.

According to an alternate embodiment other types of actuators can be used in place of electrical actuators. For example, hydraulic or pneumatic pistons can be used in place of linear electrical actuators 104-111, 204-211, 304-311, 404-411.

Figure 5:
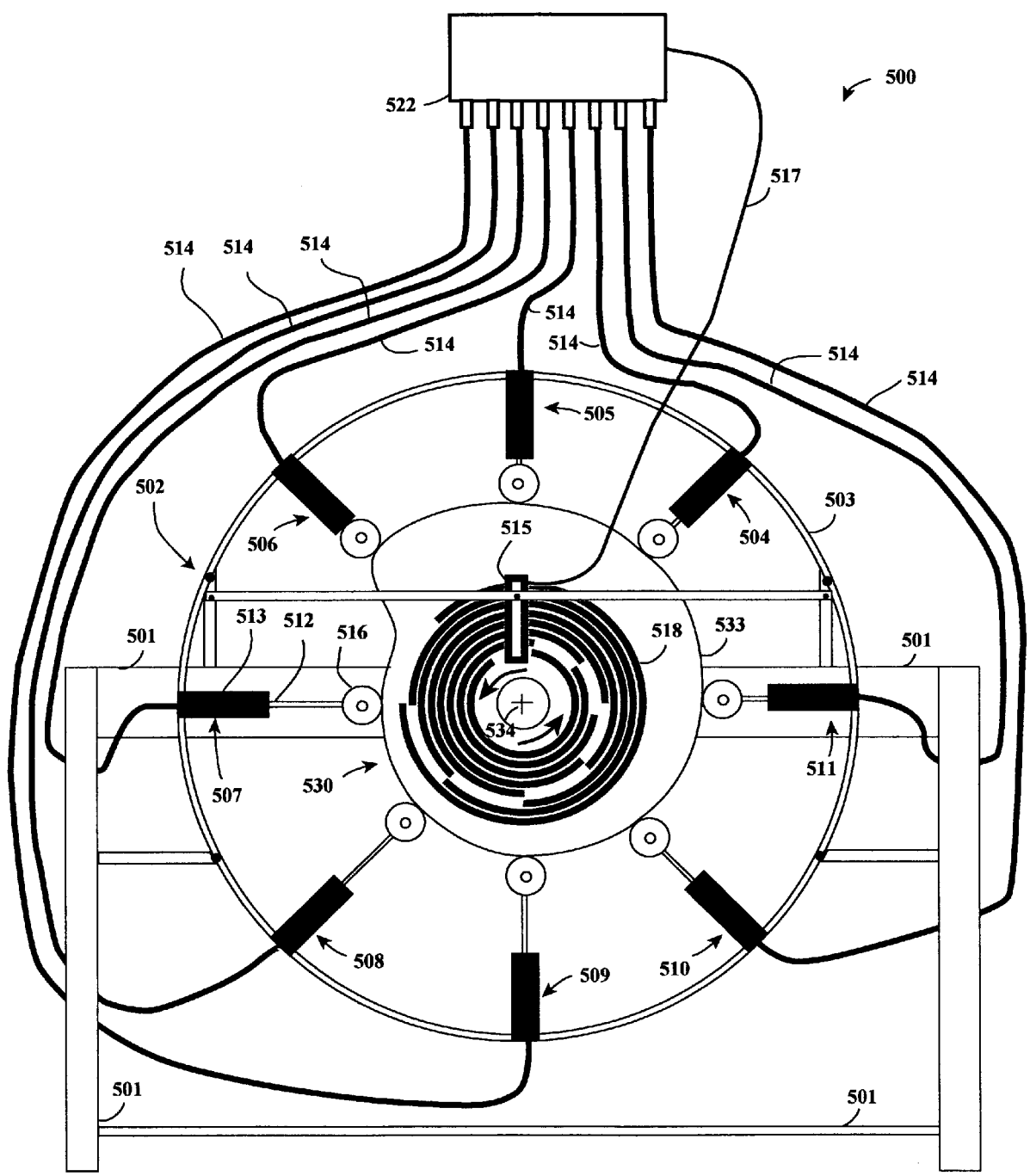
FIG. 5 shows a cross section of a motor that uses pressure activated pistons to apply force according to another embodiment of the invention.

Referring now to FIG. 5, there is shown a motor 500 according to another embodiment of the present invention comprising a frame 501, which includes an actuator assembly 502 having a rim 503. Actuator assembly 502 is preferably circular and includes a plurality of actuators 504-511 positioned approximately radially relative to the actuator assembly 502. Actuators 504-511 are activated by the pressure of a working fluid such hydraulic fluid or pneumatic gas, which is applied through a plurality of hoses 514. Motor 500 also includes a rotatable assembly 530. Rotatable assembly 530 rotates about axle 534, which is rotatably connected to frame 501. Rotatable assembly 530 preferably has a spirally-shaped rim 532.

Each actuator 504-511 includes an actuator shaft 512, an actuator cylinder 513 and a hose 514 for providing hydraulic or pneumatic pressure to actuator 504-511. Preferably, actuator 504-511 also includes a roller 516 or another friction reducing element, such as a bearing or low friction pad at its inner end. Motor 500 also includes a source of working fluid pressure (not shown). Pressure source includes a controller 522 for selectively providing pressure through hoses 514, each of which is connected to a separate actuator 504-511.

Actuator cylinder 513 can be single acting or double acting, depending on the source of pressure that is used and the needs of a specific application. For example, a single acting cylinder 513 with an exhaust port or valve at its maximum extension position would allow working fluid (e.g., air or other gas) to vent to the atmosphere upon maximum extension. Alternatively, a double acting cylinder could also be used, in which case working fluid (e.g., hydraulic fluid) could be recovered through hose 514 and an additional set of hoses 514 would connect controller 522 with actuators 504-511. Actuators 504-511 may be adjustably attached to actuator assembly 502 so that the angle of incidence between each of said actuators 504-511 and said rotatable assembly 530 can be adjusted to control the torque and speed output of motor 500.

A sensor 515 senses the relative rotational position of rotatable assembly 530 and provides a signal to controller 522 by means of an input means 517. Input means preferably is an electrical cable for transmitting an electrical signal from sensor 515 to controller 522. Alternatively, input means 517 can use radio frequency, infra-red, other wireless methods, or a mechanical method to transmit a signal from sensor 515 to controller 522. Which of actuators 504-511 should be activated to initiate or continue rotation of rotatable assembly 530 is determined by the relative rotational position of rotatable assembly 530. Sensor 515 senses the relative rotational position of rotatable assembly 530, for example by sensing visual indicators 518, which are positioned on rotatable assembly 530. Alternatively, sensor 515 can sense electrical indicators on rotatable assembly 530 or can use any other method, including mechanical methods, of sensing the relative rotational position of rotatable assembly 530.

In operation of motor 500, controller 522 causes working fluid pressure to be applied to a hose 514, which activates one of actuators 504-511 and causes actuator shaft 512 to extend out of actuator cylinder 513. Controller 522 also controls the portion of the motors rotational cycle during which working fluid pressure is provided to any one of actuators 504-511. The portion of the rotational cycle during which working fluid pressure is provided to any one of actuators 504-511 can be selected according to the desired speed of motor 500, provided that pressure must be applied to any one of actuators 504-511 for less than the entire rotational cycle, to allow time for the actuator 504-511 to return to a retracted position.

As it extends out of actuator cylinder 513, the end of actuator shaft 512 or a roller 516 at the end of actuator shaft 512 contacts the rim 532 of rotatable assembly 530. As actuator shaft 512 exerts force on the rim 532 of rotatable assembly 530, it causes rotatable assembly 530 to rotate in a direction that increases the distance between actuator assembly rim 503 and the rim 532 of rotatable assembly 530. As rotatable assembly 530 rotates and while said one of actuators 504-511 continues to receive pressure from pressure source through controller 522 and hose 514, actuator 504-511 continues to exert force against rim 532 of rotatable assembly 530, until said one of actuators 504-511 has rotated a specified portion of the distance around axle 534. When said one of actuators 504-511 has rotated a specified portion of the distance around axle 534 controller 522 receives an input from sensor 515 (via input means 517), which causes controller 522 to stop providing pressure to the selected actuator 504-511 and actuator shaft 516 no longer exerts force against rim 532 of rotatable assembly 530.

According to this embodiment, it is possible to vary the shape of the rim 532 of rotatable assembly 530 to match the force output of actuator 504-511, to provide an even application of torque or speed to a particular motor load. Specifically, the angle or degree or spiral of rim 532 can be modified to produce more or less torque. Furthermore, those skilled in the art will recognize that the hydraulic or pneumatic activation means of this embodiment can be employed through retracting actuators in a manner similar to that disclosed in FIG. 4.

What is claimed is:

1. A motor for converting linear force into rotational movement, comprising:
    a frame, further comprising an actuator assembly with a plurality of radially positioned linear actuators;
    a rotatable assembly for rotating about an axle attached to the frame;
    a power source;
    a means for selectively providing power from the power source to said actuators;
    wherein said rotatable assembly has a rim that is spiral in shape with respect to a plane passing through said axle; and
    wherein each said linear actuator selectively and sequentially applies linear force against the rim of the rotatable assembly to cause the rotatable assembly to rotate about said axle.

2. The motor of claim 1 wherein the spirally shaped rim of the rotatable assembly is adjustable.

3. The motor of claim 1 wherein the angle formed by said actuator at the point of contact with the rotatable assembly is adjustable.

4. The motor of claim 1 wherein said actuator is electrically activated and wherein said power source is electrical.

5. The motor of claim 4 wherein said means for selectively providing power is a conductive strip that rotates with the rotatable assembly.

6. The motor of claim 1 wherein said means for selectively providing power includes a controller for selectively providing working fluid under pressure to said actuators in response to a sensor that senses the rotational position of said rotatable assembly relative to said frame.

7. The motor of claim 6 wherein said actuator is pneumatically activated, wherein said power source provides pneumatic pressure and wherein said working fluid is a gas.

8. The motor of claim 6 wherein said actuator is hydraulically activated, wherein said power source provides hydraulic pressure and wherein said working fluid is liquid.

9. The motor of claim 1 wherein said liner actuator exerts force against said rim as said actuator extends.

10. The motor of claim 1 wherein said liner actuator exerts force against said rim as said actuator retracts.

* * * * *